(12) United States Patent
Xu et al.

(10) Patent No.: US 11,798,228 B2
(45) Date of Patent: Oct. 24, 2023

(54) METHOD FOR UPDATING ROAD SIGNS AND MARKINGS ON BASIS OF MONOCULAR IMAGES

(71) Applicant: SPEED TECHNOLOGY CO., LTD., Jiangsu (CN)

(72) Inventors: Zhongjian Xu, Jiangsu (CN); Biliang Zhu, Jiangsu (CN); Jun Li, Jiangsu (CN)

(73) Assignee: SPEED TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/914,770

(22) PCT Filed: Mar. 30, 2021

(86) PCT No.: PCT/CN2021/084079
§ 371 (c)(1),
(2) Date: Sep. 27, 2022

(87) PCT Pub. No.: WO2021/197341
PCT Pub. Date: Oct. 7, 2021

(65) Prior Publication Data
US 2023/0135512 A1    May 4, 2023

(30) Foreign Application Priority Data
Apr. 3, 2020  (CN) .......................... 202010256909.9

(51) Int. Cl.
*G06T 7/50*    (2017.01)
*G06V 10/46*   (2022.01)
(Continued)

(52) U.S. Cl.
CPC ............. *G06T 17/05* (2013.01); *G06N 20/00* (2019.01); *G06T 5/002* (2013.01); *G06T 5/006* (2013.01);
(Continued)

(58) Field of Classification Search
None
See application file for complete search history.

(56) References Cited

U.S. PATENT DOCUMENTS 10,359,518 B2    7/2019   Wheeler
10,657,668 B2 *  5/2020   Hassan ................ G06V 10/245
(Continued)

FOREIGN PATENT DOCUMENTS

CN    204347921    5/2015
CN    106683131    5/2017
(Continued)

OTHER PUBLICATIONS

STIC translation of JP2007-280387A (Year: 2007).*
(Continued)

*Primary Examiner* — Tyler W. Sullivan
(74) *Attorney, Agent, or Firm* — JCIPRNET (57) ABSTRACT

A method for updating road signs and markings on the basis of monocular images comprises the following steps: acquiring street images of urban roads and GPS phase center coordinates and spatial attitude data corresponding to the street images; extracting coordinates of the road sign marking images; constructing a sparse three-dimensional model, and then generating a streetscape image depth map; calculating the space position of the road sign and marking according to the semantic and depth values of the image, the collinear equation and the space distance relation; if the same road sign and marking is visible in multiple views, solving the position information of the road sign; and vectorizing the obtained road sign position information, and fusing the information into the original data to realize the updating of the road sign data.

7 Claims, 5 Drawing Sheets

(51) Int. Cl.
- *G06V 20/10* (2022.01)
- *G06N 20/00* (2019.01)
- *G06T 7/11* (2017.01)
- *G06V 10/26* (2022.01)
- *G06V 10/48* (2022.01)
- *G06V 10/82* (2022.01)
- *G06N 3/10* (2006.01)
- *G06T 7/194* (2017.01)
- *G06T 17/05* (2011.01)
- *G06T 7/70* (2017.01)
- *G06T 5/00* (2006.01)

(52) U.S. Cl.
CPC ............... *G06T 7/11* (2017.01); *G06T 7/50* (2017.01); *G06T 7/70* (2017.01); *G06V 10/26* (2022.01); *G06V 10/267* (2022.01); *G06V 10/462* (2022.01); *G06V 10/48* (2022.01); *G06V 10/82* (2022.01); *G06V 20/176* (2022.01); *G06N 3/10* (2013.01); *G06T 7/194* (2017.01); *G06T 2207/20084* (2013.01); *G06T 2207/30256* (2013.01)

(56) References Cited

U.S. PATENT DOCUMENTS

| | | | |
|---|---|---|---|
| 10,929,694 B1 * | 2/2021 | Zhang | ............ G06F 18/23 |
| 11,210,801 B1 * | 12/2021 | Zhang | ............ G06V 10/811 |
| 2021/0206519 A1 * | 7/2021 | Shockley | ............ B64G 1/285 |

FOREIGN PATENT DOCUMENTS

| | | | | |
|---|---|---|---|---|
| CN | 106023207 | | 2/2019 | |
| CN | 110648389 | | 1/2020 | |
| CN | 110763203 | | 2/2020 | |
| CN | 111144388 | | 5/2020 | |
| EP | 3407294 B1 * | | 3/2021 | ............ G01C 21/18 |
| JP | 2007280387 A * | | 10/2007 | ............ G06T 7/215 |
| WO | WO-2017124901 A1 * | | 7/2017 | ............ G01C 21/18 |
| WO | WO-2018104563 A2 * | | 6/2018 | ............ G01C 21/32 |

OTHER PUBLICATIONS

"International Search Report (Form PCT/ISA/210) of PCT/CN2021/084079," dated Jun. 30, 2021, with English translation thereof, pp. 1-4.

"Written Opinion of the International Searching Authority (Form PCT/ISA/237) of PCT/CN2021/084079," dated Jun. 30, 2021, pp. 1-4.

* cited by examiner

METHOD FOR UPDATING ROAD SIGNS AND MARKINGS ON BASIS OF MONOCULAR IMAGES

CROSS-REFERENCE TO RELATED APPLICATION

This application is a 371 of international application of PCT application serial no. PCT/CN2021/084079, filed on Mar. 30, 2021, which claims the priority benefit of China application no. 202010256909.9, filed on Apr. 3, 2020. The entirety of each of the above mentioned patent applications is hereby incorporated by reference herein and made a part of this specification.

TECHNICAL FIELD

The present invention relates to the technical field of surveying and mapping geographic information, and in particular to a method for updating road signs and markings on the basis of monocular images.

DESCRIPTION OF RELATED ART

High-accuracy and real-time urban road traffic information plays an important role in urban road maintenance, traffic navigation and planning and construction. At present, the information of road signs and markings is mainly obtained through field acquisition or manual acquisition on remote sensing images. The acquisition workload is large and the update cycle is long, so it is difficult to meet the data needs of rapid urban renewal.

Compared with the traditional road data acquisition, the technology of reconstructing the three-dimensional expressway model by using images or laser point clouds has made some progress. However, the reconstructed model does not have monolithic semantic information and is difficult to be used for urban road planning and management. Further digital acquisition is still needed to generate urban road signs and markings that meet the requirements.

In order to solve the problem on the updating accuracy and cycle of the above data, domestic scholars have carried out relevant research. For example, Chinese patent document CN106023207B discloses a city component collecting method on the basis of double panoramas of a mobile measuring system. After determining the city component to be extracted from the current panoramic image, the method automatically searches the panoramic adjacent panoramic image; after that a city component to be extracted is determined in a present panorama image, a panorama image adjacent to the panorama is searched automatically; pixel positions of the city component in the present panorama image are obtained in an interactive manner, and plane coordinates of the city component are calculated on the basis of a panorama ray intersection method. However, the work innovation of the present invention still requires human-computer interaction to acquire city component information, and meanwhile the method based on stereo image pairs cannot obtain all city component positions in the case of small overlap.

The patent CN204347921U discloses a city component surveying indoor and field acquisition integration method, which selects the three-star geographic information collection equipment based on Beidou satellite navigation technology in the component census project, reducing the utilization of human resources; the data dictionary technology is applied to the component surveying attribute data entry, and then the attribute entry time can be saved; when the field acquisition integration is completed, the warehousing is completed, and then the indoor data entry time can be saved. The patent CN106683131A proposes a city component automation measurement method, which extracts the plane geometric center position of a city component through acquisition of point cloud, close-range image and other data using point cloud filtration, segmentation and other methods. The patent CN110763203A provides a city component positioning method and device and a vehicle-mounted mobile measurement device. The method comprises the steps of obtaining a current streetscape image and an adjacent streetscape image, as well as corresponding GPS phase center coordinate and spatial attitude data, and extracting at least one appointed city component; extracting image points of the same name from the current streetscape image and the adjacent streetscape image by using an image template matching method; calculating the spatial geographic coordinates of city components on the basis of the forward intersection method. The above patents gradually convert the field acquisition of city components to semi-automatic production in the field, greatly reducing the efficiency of field acquisition and shortening the cycle of data acquisition.

The above researches have greatly improved the efficiency of automatic acquisition of city components, and solved the problem on updating the ancillary facilities such as signs on the road. However, with the development of cloud storage and "crowdsourcing" technology, the method for automatically acquiring city components on the basis of monocular streetscape images will become the mainstream direction of future development. This technology not only reduces the acquisition cost faced by laser radar and traditional field surveying and mapping, but also provides more abundant image semantic information.

Therefore, it is necessary to develop a method for intelligently updating road signs and markings on the basis of monocular images. This technology not only solves the problem on data updating of city components, but also will be applied in the acquisition field of urban road signs and markings.

BRIEF SUMMARY OF THE INVENTION

The technical problem to be solved by the present invention is to provide a method for updating road signs and markings on the basis of monocular images, which not only solves the problem on updating the data of urban road signs and markings, but also will be applied in the field of navigation electronic map data production.

To solve the above technical problem, the technical solution of the present invention is: a method for updating road signs and markings on the basis of monocular images, comprising the following steps:

S1, acquiring street images of urban roads and GPS phase center coordinates and spatial attitude data corresponding to the street images by mobile data acquisition equipment;

S2, sequentially preprocessing and distortion correcting the streetscape images obtained in step S1, semantically segmenting elements on the corrected images using the deep learning semantic segmentation technology by category, converting the segmented streetscape images of the road signs and markings into binary image maps, and extracting image coordinates of skeleton points of road signs and image positions of road markings in the binary image maps;

S3, constructing a sparse three-dimensional model, calculating the attitude data of the mobile data acquisition equipment and the spatial position of the sparse three-dimensional point cloud, and then generating a streetscape image depth map on the basis of the multi-view dense reconstruction technology according to the reconstructed sparse three-dimensional point cloud and the internal and external parameters of the mobile data acquisition equipment; and S4, calculating the spatial positions of the road signs and markings according to the semantic and depth values of the image, the collinear equation and the spatial distance relationship;

S5, if the same road sign and marking is visible in multiple views, solving the position information of the road sign and marking by adopting a multi-view forward intersection method; and S6, vectorizing the position information of the road signs and markings obtained in steps S4 and S5, and fusing into the original data to update the data of the road signs and markings.

With the above technical solution, the streetscape images and GPS/IMU data are acquired by mobile data acquisition equipment, and then the GPS/IMU data are gradually fused through the incremental SFM algorithm to improve the accuracy of model reconstruction, and the model coordinates of the regional network are incorporated into the real geodetic coordinate system, so as to facilitate the accurate construction of the depth map based on the multi-view dense reconstruction algorithm.

As the preferred technical solution of the present invention, the mobile data acquisition equipment in step S1 integrates a monocular camera and a GPS/IMU equipment, the mobile data acquisition equipment is installed in a forward-looking window of a vehicle, and then the relative pose relationship between the monocular camera and the GPS/IMU equipment and the internal reference information of the monocular camera through calibration. The pose inconsistency between the monocular camera and the GPS/IMU equipment is mainly caused by the non-parallel axes during the installation process. The internal reference calibration of the camera is mainly to solve the radial and tangential distortion of the camera lens. Such calibration data will directly determine the accuracy of subsequent depth map calculation.

As the preferred technical solution of the present invention, step S2 specifically comprises the following steps:
preprocessing the streetscape images using image enhancement and de-noising technologies to reduce the influence of image noise on the streetscape images;
carrying out distortion correction on the preprocessed streetscape images in combination with the internal reference of the monocular camera;
making the streetscape images after distortion correction into DeeplabV3+network training dataset on the basis of the data label tool, and adopting the GeoAI deep learning framework to realize the training, validation and testing of the model, and segmenting label elements on the streetscape images by category, the label elements comprising sky, trees, road signs, road markings and lane surfaces;
eliminating the sky and trees in the images after distortion correction by using image mask technology on the basis of the semantic segmented label data;
carrying out semantic segmentation on elements of road signs and markings in streetscape images, converting the images into binary images, and extracting image coordinate information of the road signs and markings from the binary images by using different vision algorithms;
extracting a connected region of a binary image for road sign elements, and calculating a shape descriptor of the connected region to extract image coordinates of skeleton points of road signs; and
extracting image positions of road markings for road marking elements by using Hough transform algorithm.

The process of image enhancement and de-noising in step S2 mainly solves the problem that the exposure intensities of the photos are inconsistent due to the influence of solar rays at different incident angles when the vehicle acquires data on the road. DeeplabV3+network model is the one mentioned in *Encoder-Decoder with Atrous Separable Convolution for Semantic Image Segmentation*; Hough transform algorithm is the one mentioned in *Generalizing the Hough transform to detect arbitrary shapes*.

As the preferred technical solution of the present invention, in step S4 of calculating the spatial positions of the road signs and markings according to the collinear equation and the spatial distance relationship with the object space imaging in front of the monocular camera as the constraint condition, the calculation formula is as follows (1):

$$\begin{cases} \begin{bmatrix} x-x_0 \\ f \\ y-y_0 \end{bmatrix} = \lambda * \begin{bmatrix} a_{11} & a_{12} & a_{13} \\ b_{11} & b_{12} & b_{13} \\ c_{11} & c_{12} & c_{13} \end{bmatrix} * \begin{bmatrix} a_{21} & a_{22} & a_{23} \\ b_{21} & b_{22} & b_{23} \\ c_{21} & c_{22} & c_{23} \end{bmatrix} \begin{bmatrix} X_A - X_{S1} \\ Y_A - Y_{S1} \\ Z_A - Z_{S1} \end{bmatrix} \\ d^2 = (X_A - X_{S1})^2 + (Y_A - Y_{S1})^2 + (Z_A - Z_{S1})^2 \\ \alpha = \cos^{-1} \dfrac{(X_A - X_{S1})*(X_{S2} - X_{S1}) + (Y_A - Y_{S1})*(Y_{S2} - Y_{S1}) + (Z_A - Z_{S1})*(Z_{S2} - Z_{S1})}{d * \sqrt{((X_{S2} - X_{S1})*(X_{S2} - X_{S1}) + (Y_{S2} - Y_{S1})*(Y_{S2} - Y_{S1}) + (Z_{S2} - Z_{S1})*(Z_{S2} - Z_{S1}))}}, \alpha < \pi/2 \end{cases} \quad (1)$$

where, [x, f, y] is the coordinate of the skeleton point of the road pole or one of the road signs and markings in the image plane coordinate system; $[x_0, y_0]$ is the coordinate of the main point of the image; $\lambda$ is the projection coefficient; $[\alpha_{11}, \alpha_{12}, \alpha_{13}; b_{11}, b_{12}, b_{13}; c_{11}, c_{12}, c_{13}]$ is the transition matrix from the auxiliary coordinate system of image space to the coordinate system of image plane; $[\alpha_{21}, \alpha_{22}, \alpha_{23}; b_{21}, b_{22}, b_{23}; c_{21}, c_{22}, c_{23}]$ is the transition matrix from the geodetic coordinate system to the auxiliary coordinate system of the image space; $[X_A, Y_A, Z_A]$ is the coordinate of the skeleton point of the road pole or the one of the road signs and markings in the geodetic coordinate system, and is a value to be calculated in this calculation method; $[X_{S1}, Y_{S1}, Z_{S1}]$ and $[X_{S2}, Y_{S2}, Z_{S2}]$ are coordinates of the photographing center of the cameras in the front and rear camera stations, i.e. GPS value; d is the distance from a point of the object space to the photographing center of the camera; and $\alpha$ is the plane projection value of the included angle between the photographing center line $\overline{a}$ of connecting the front and rear monocular cameras and the photographing center line $\overline{b}$ of connecting the point of the object space and the front monocular camera.

As the preferred technical solution of the present invention, step S3 specifically comprises the following steps:
S31, extracting feature points of the streetscape images through SIFT algorithm, and adopting image mask, feature extraction and matching to the original streetscape images to generate a multi-view geometrical relationship map;

S32, selecting an initial matching image pair on the basis of an incremental SFM algorithm, and constructing a regional network model; adding new sequence images iteratively in the construction of the regional network model to generate a new sparse three-dimensional model; when the number of streetscape images in the sparse three-dimensional model is less than 3, continuing to add new sequence images, until the number of streetscape images in the sparse three-dimensional model is greater than 3;

S33, when the number of streetscape images in the sparse three-dimensional model is greater than 3, fusing GPS/IMU prior constraint data to reduce the accumulation of model errors, incorporating the regional network model coordinates into the real geodetic coordinate system by an absolute orientation method, solving the model error with the absolute orientation model by formula (2), if the model error is greater than 10 cm, discarding the reconstructed regional network model, repeating steps S32-S33, and continuing to initialize and construct the next regional network model, until the model error is less than 10 cm;

As the preferred technical solution of the present invention, the formula (2) in step S33 is:

$$\begin{cases} \begin{bmatrix} \sigma_{xi}^2 \\ \sigma_{yi}^2 \\ \sigma_{zi}^2 \end{bmatrix} = \lambda * \begin{bmatrix} a_1 & a_2 & a_3 \\ b_1 & b_2 & b_3 \\ c_1 & c_2 & c_3 \end{bmatrix} \begin{bmatrix} X_i \\ Y_i \\ Z_i \end{bmatrix} + \begin{bmatrix} X_0 \\ Y_0 \\ Z_0 \end{bmatrix} - \begin{bmatrix} X_t^i \\ Y_t^i \\ Z_t^i \end{bmatrix} \\ \sigma = \dfrac{\sqrt{\sum_1^n (\sigma_{xi}^2 + \sigma_{yi}^2 + \sigma_{zi}^2)}}{n} \end{cases} \quad (2)$$

where, $[X_i, Y_i, Z_i]$ is the model coordinate of the i-th checkpoint $\lambda$, $[\alpha_1, \alpha_2, \alpha_3; b_1, b_2, b_3; c_1, c_2, c_3]$ and $[X_0, Y_0, Z_0]$ are absolute orientation 7-parameter models; $[X_t^i, Y_t^i, Z_t^i]$ is the real geodetic coordinate of the i-th checkpoint $[\sigma_{xi}, \sigma_{yi}, \sigma_{zi}]$ is the mean square error component corresponding to the i-th checkpoint, $\sigma$ is the mean square error of the point, and n is the number of checkpoints.

S34, when the model error is less than 10 cm, adopting the local bundle adjustment to further optimize the attitude information of the monocular camera; after all the streetscape images are constructed, use the global bundle adjustment to further optimize and solve the internal and external parameter information of the sparse three-dimensional point cloud and the camera; and S35, reconstructing a streetscape image depth map by using the multi-view dense reconstruction method.

In step S3, the present invention proposes to gradually fuse GPS/IMU data, so as to solve the problem on model distortion or camera attitude reconstruction error in SFM reconstruction, and realize the conversion from regional network model coordinates to real geodetic coordinates.

SIFT algorithm is mentioned in Lowe's *Distinctive image features from scale-invariant keypoints*, and the algorithm used in the present invention is Johannes L. On the basis of the incremental three-dimensional reconstruction algorithm (SFM) proposed in Structure-from-Motion Revisited by Schönberger, GPS/IMU data are fused, and the bundle adjustment model in photogrammetry is introduced to control the accumulation of the regional network model errors; After all the images are constructed, the global bundle adjustment model is further optimized to construct the sparse three-dimensional point cloud and the internal and external parameters of the monocular camera with higher accuracy. A streetscape image depth map is generated according to the internal and external parameters of the reconstructed sparse three-dimensional point cloud and camera based on the multi-view dense reconstruction algorithm (MVS) proposed in *Pixelwise View Selection for Unstructured Multi-View Stereo* by Johannes L. Schönberger.

As the preferred technical solution of the present invention, in step S5, when the same road signs and markings are visible in multiple views, the accurate position information is obtained by the least square fitting, as shown in formula (3), $$\begin{cases} \begin{bmatrix} x_1 - x_0 \\ f \\ y_1 - y_0 \end{bmatrix} = \lambda * \begin{bmatrix} a_{11} & a_{12} & a_{13} \\ b_{11} & b_{12} & b_{13} \\ c_{11} & c_{12} & c_{13} \end{bmatrix} * \begin{bmatrix} a_1 & a_2 & a_3 \\ b_1 & b_2 & b_3 \\ c_1 & c_2 & c_3 \end{bmatrix} \begin{bmatrix} X_A - X_{S1} \\ Y_A - Y_{S1} \\ Z_A - Z_{S1} \end{bmatrix} \\ \vdots \\ \begin{bmatrix} x_n - x_0 \\ f \\ y_n - y_0 \end{bmatrix} = \lambda * \begin{bmatrix} a_{n1} & a_{n2} & a_{n3} \\ b_{n1} & b_{n2} & b_{n3} \\ c_{n1} & c_{n2} & c_{n3} \end{bmatrix} * \begin{bmatrix} a_1 & a_2 & a_3 \\ b_1 & b_2 & b_3 \\ c_1 & c_2 & c_3 \end{bmatrix} \begin{bmatrix} X_A - X_{Sn} \\ Y_A - Y_{Sn} \\ Z_A - Z_{Sn} \end{bmatrix} \\ d_i^2 = (X_A - X_{Si})^2 + (Y_A - Y_{Si})^2 + (Z_A - Z_{Si})^2 \quad 1 \le i \le n \end{cases} \quad (3)$$

where, $[x_1, y_1, x_n, y_n]$ is the image coordinate projected on multiple views for the same road sign or marking of the object space; $[x_0, y_0]$ is the coordinate of the main point of the image; f is the focal distance of the camera; $\lambda$ is the projection coefficient; $[X_A, Y_A, Z_A]$ is the object space coordinate to be calculated for the road sign and marking; $[X_{Si}, Y_{Si}, Z_{Si}]$ is the corresponding camera position for the i-th image, $1 \le i \le n$, when i is n, $[X_{Sn}, Y_{Sn}, Z_{Sn}]$; $[\alpha_{11}, \alpha_{12}, \alpha_{13}; b_{11}, b_{12}, b_{13}; c_{11}, c_{12}, c_{13}]$ and $[\alpha_{n1}, \alpha_{n2}, \alpha_{n3}; b_{n1}, b_{n2}, b_{n3}; c_{n1}, c_{n2}, c_{n3}]$ are expressed as the transition matrix from the auxiliary coordinate system of the image space to the coordinate system of the image plane of the corresponding image; $[\alpha_1, \alpha_2, \alpha_3; b_1, b_2, b_3; c_1, c_2, c_3]$ is the transition matrix from the geodetic coordinate system to the auxiliary coordinate system of the image space; and $d_i$ is the spatial distance between the road sign and marking to be calculate and the photographing center of the i-th streetscape image.

As the preferred technical solution of the present invention, step S4 further comprises: for the problem on longitudinal imaging of the road pole sign on the streetscape image, when the included angle of plane projection between the line connecting the photographing center of the monocular camera with the undetermined position of the road pole sign $\overline{a}$ and the vehicle traveling direction $\overline{b}$ is $\alpha < 90°$, this coordinate is selected as the spatial position of the road pole sign. When the sign of the road pole is imaged longitudinally on the image, the extracted skeleton point of the road pole is different with the height of the road pole, and there are two cases: higher than the installation position of the monocular camera and lower than the installation position of the monocular camera, resulting in the problem on multiple solutions to the spatial position information of the road sign solved in step S4. Therefore, by adding the constraint of the vehicle driving direction, that is, the included angle $\alpha$ of plane projection between the line $\overline{a}$ of connecting the camera photographing center with the undetermined position of the road pole sign and the vehicle traveling direction $\overline{b}$, if $\alpha < 90°$, this coordinate is selected as the spatial position of the road pole sign.

As the preferred technical solution of the present invention, in step S23 of carrying out element segmentation on streetscape images after distortion correction specifically comprises the following steps:

S231, data preparation: with reference to format specifications of open source datasets, structuring the data of streetscape images, and importing data labels;

S232, carrying out model training, validation and testing by using GeoAI depth learning framework in combination with DeeplabV3+neural network model;

S2321, setting parameters, and importing the training model;

S2322, carrying out model training;

S2323, carrying out model validation if the obtained model is the global optimal value; in case of not returning to step S2322, carrying out model training again, until the obtained model is the global optimal value;

S2324, if the model validation result meets the accuracy, outputting the model; in case of not meeting the accuracy, returning to step S2321, repeating steps S2321-S2324 until the model validation results meet the accuracy, and outputting the model;

S2325, visualizing the test results of the output model, determining whether the generalization is satisfied, and if so, deploying and applying the model; and if not, returning to step S231, repeating steps S231-S2325, until the generalization is satisfied; and S233, model deployment and application: saving the model locally and deploying the model to the server to achieve semantic segmentation of the scene.

Compared with the prior art, the present invention has the following beneficial effects: it designs a field data acquisition mode, uses the image map of a monocular camera, and realizes data crowdsourcing acquisition at a lower cost; combined with the deep learning technology, the image semantic segmentation is realized, and the extraction of road signs and markings is completed; on the basis of SFM algorithm, GPS/IMU data are fused to improve the calculation accuracy of the internal and external parameters and sparse 3D point cloud of the camera, and the depth map is constructed by multi-view dense reconstruction technology; and in the multi-view geometry, the collinear equation and spatial distance relationship constraint conditions are used to fit and solve the spatial positions of road signs and markings, so as to make the locations of signs and markings in streetscape images more accurate.

DETAILED DESCRIPTION OF THE INVENTION

The technical solutions in the embodiments of the present invention will be clearly and completely described below in conjunction with the drawings in the embodiments of the present invention.

Figure 1:
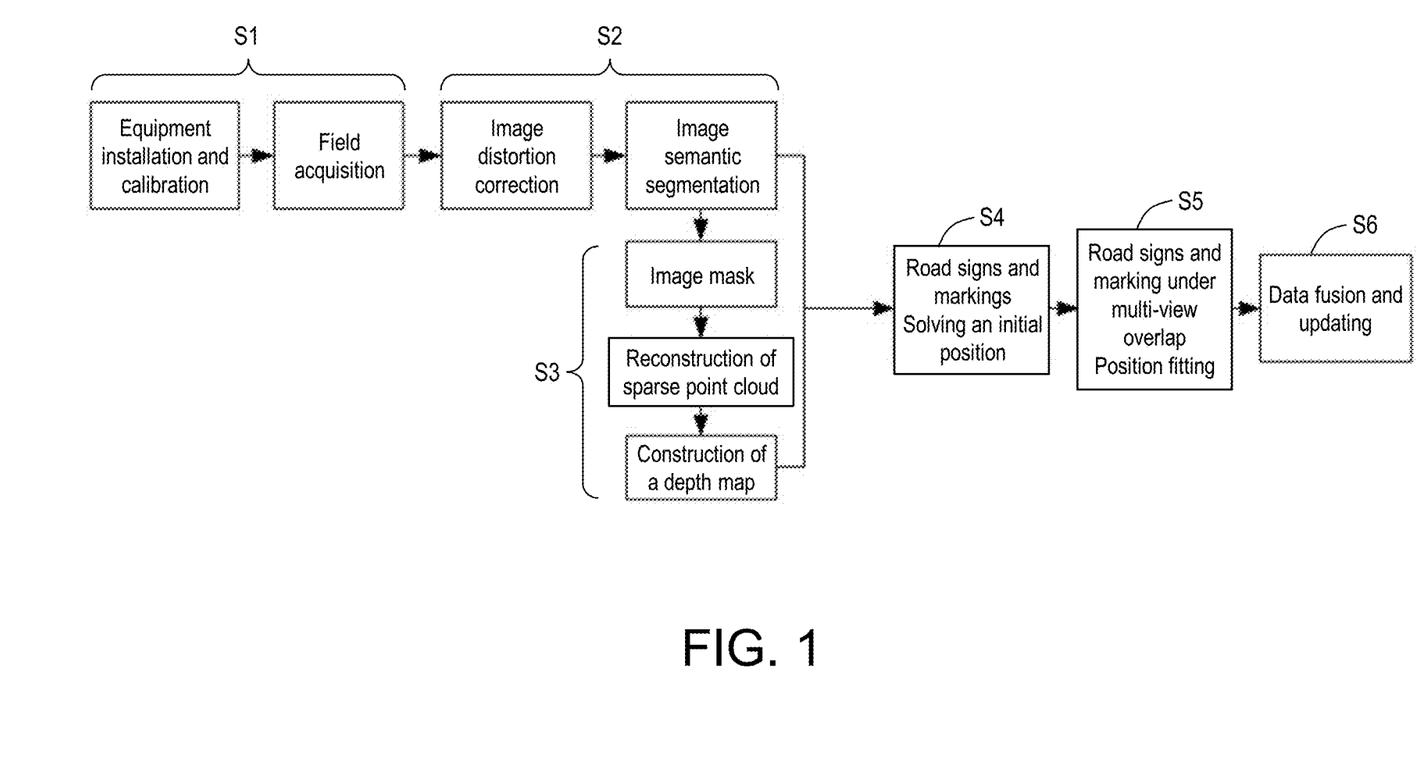
FIG. 1 is a flowchart of a method for updating road signs and markings on the basis of monocular images according to the present invention.

Embodiment: as shown in FIG. 1, a method for updating road signs and markings on the basis of monocular images, specifically comprising the following steps:

S1, equipment installation, calibration and field acquisition: acquiring street images of urban roads and GPS phase center coordinates and spatial attitude data corresponding to the street images by mobile data acquisition equipment; the mobile data acquisition equipment in step S1 integrates a monocular camera and a GPS/IMU equipment, the mobile data acquisition equipment is installed in a forward-looking window of a vehicle, and then the relative pose relationship between the monocular camera and the GPS/IMU equipment and the internal reference information of the monocular camera through calibration by two-dimensional/three-dimensional calibration field; the pose inconsistency between the monocular camera and the GPS/IMU equipment is mainly caused by the non-parallel axes during the installation process. The internal reference calibration of the camera is mainly to solve the radial and tangential distortion of the camera lens. Such calibration data will directly determine the accuracy of subsequent depth map calculation;

S2, image distortion correction and semantic segmentation: sequentially preprocessing and distortion correcting the streetscape images obtained in step S1, semantically segmenting elements on the corrected streetscape images using the deep learning semantic segmentation technology by category; converting the streetscape images into binary images for semantic segmentation on the streetscape images of the road sign and marking element, and then extracting the image coordinates of the skeleton point of the road sign and the image position of the road marking in the binary image map.

Step S2 specifically comprises the following steps:

preprocessing the streetscape images using image enhancement and de-noising technologies to reduce the influence of image noise on the streetscape images;

carrying out distortion correction on the preprocessed streetscape images in combination with the internal reference of the monocular camera; and making the streetscape images after distortion correction into DeeplabV3+network training dataset on the basis of the data label tool, and adopting the GeoAI deep learning framework to realize the training, validation and testing of the model, and segmenting the elements on the images by category, the elements comprising sky, trees, road signs, road markings and lane surfaces.

Figure 2:
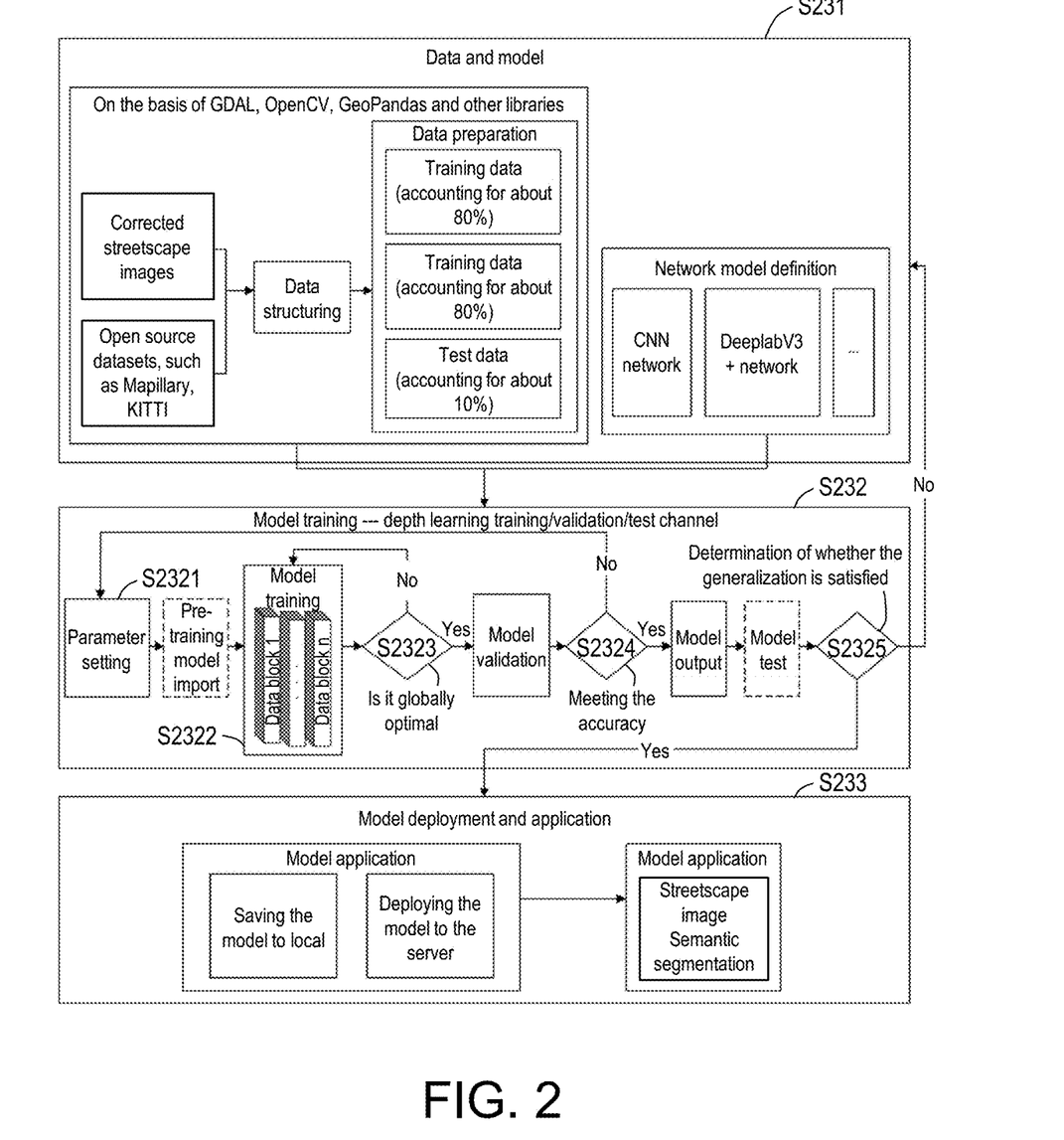
FIG. 2 is a flowchart of image semantic segmentation in a method for updating road signs and markings on the basis of monocular images based on GeoAI according to the present invention.

As shown in FIG. 2, segmenting the elements on the streetscape images after distortion correction specifically comprises the following steps:

S231, data preparation: structuring the streetscape image data according to the open source datasets (such as Mapillary, Karlsruhe Institute of Technology and Toyota Technological Institute (KITTI)), and importing the data labels by sample batches;

S232, carrying out model training, validation and testing by using GeoAI depth learning framework in combination with DeeplabV3+neural network model;

S2321, setting parameters, and importing the training model;

S2322, carrying out model training;

S2323, carrying out model validation if the obtained model is the global optimal value; in case of not returning to step S2322, carrying out model training again, until the obtained model is the global optimal value;

S2324, if the model validation result meets the accuracy, outputting the model; in case of not meeting the accuracy, returning to step S2321, repeating steps S2321-S2324 until the model validation results meet the accuracy, and outputting the model;

S2325, visualizing the test results of the output model, determining whether the generalization is satisfied, and if so, deploying and applying the model; if not, returning to step S231, repeating steps S231-S2325, until the generalization is satisfied; and generalization is satisfied, and if so, deploying and applying the model; if not, returning to step S231, repeating steps S231-S2325, until the generalization is satisfied; and S233, model deployment and application: saving the model locally and deploying the model to the server, and batch forecasting the segmentation results of streetscape images to achieve semantic segmentation of the scene.

Step S2 specifically further comprises the following steps: eliminating the sky and trees in the images after distortion correction by using image mask technology; and converting the streetscape image map of the road sign and marking element in streetscape images after segmentation into a binary image map, and extracting the information at the skeleton point of the road sign from the binary images by using different vision algorithms.

The converting the streetscape image map of the road sign and marking element in streetscape images after segmentation into a binary image map after segmentation into a binary image map comprises extracting a connected region of a binary image for road sign elements, and calculating a shape descriptor of the connected region to extract image coordinates of skeleton points of road signs; and The extracting the information at the skeleton point of the road sign from the binary images by using different vision algorithms comprises extracting image positions of road markings by Hough transform algorithm mentioned in *Generalizing the Hough transform to detect arbitrary shapes* for the road marking elements.

The process of image enhancement and de-noising in step S2 mainly solves the problem that the exposure intensities of the photos are inconsistent due to the influence of solar rays at different incident angles when the vehicle acquires data on the road.

S3, image mask, reconstruction of sparse point cloud and construction of depth map: on the basis of the incremental SFM algorithm, fusing GPS/IMU data, reconstructing sparse three-dimensional point cloud, calculating the internal and external parameters of the camera and the sparse three-dimensional point cloud information, and then generating a streetscape image depth map on the basis of the multi-view dense reconstruction algorithm according to the reconstructed sparse three-dimensional point cloud and the internal and external parameters of the camera.

Figure 3:
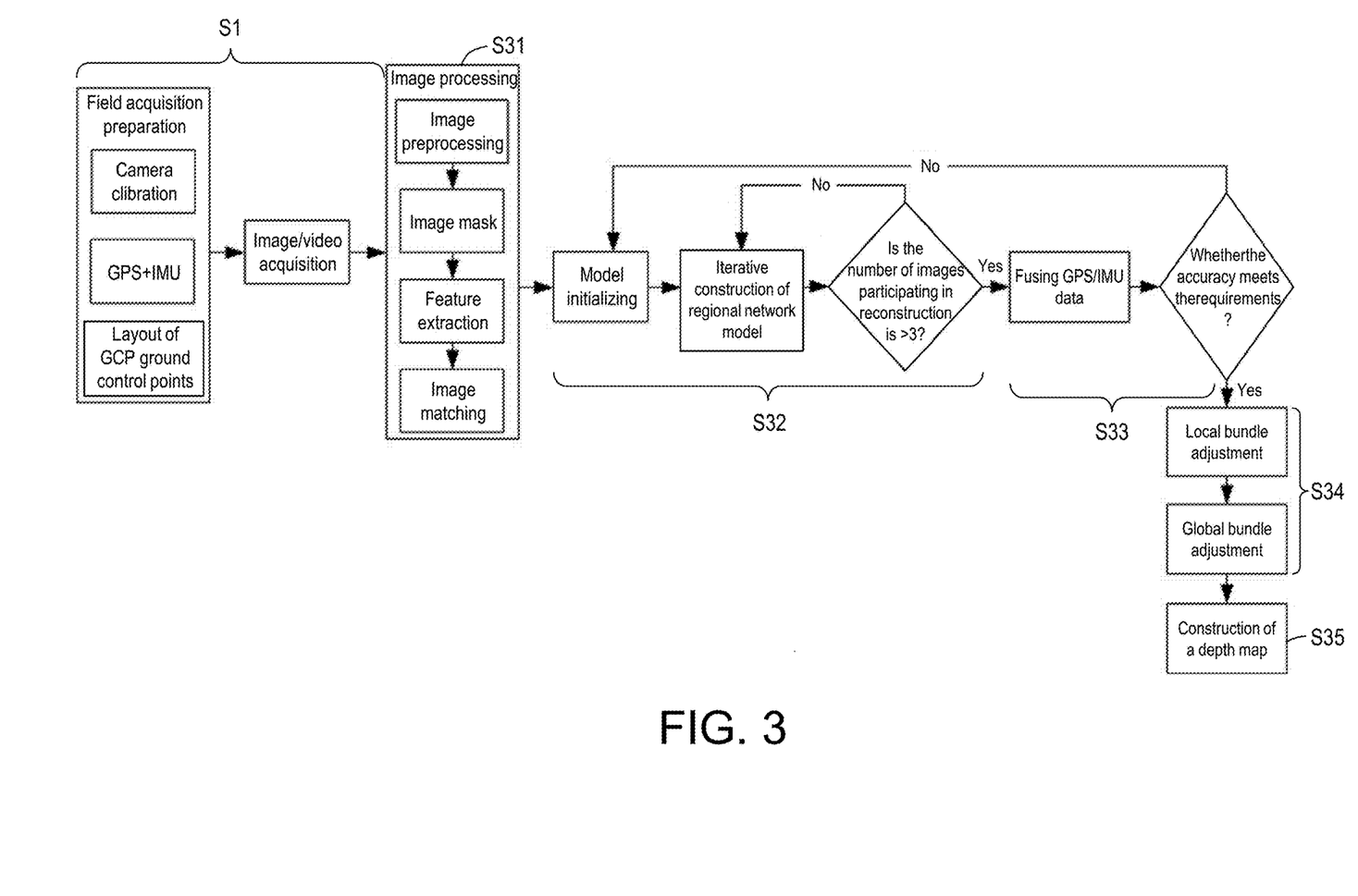
FIG. 3 is a flowchart of constructing a monocular depth map in a method for updating road signs and markings on the basis of monocular images according to the present invention.

As shown in FIG. 3, step S3 specifically comprises the following steps:

S31, extracting feature points of the streetscape images through SIFT algorithm, and adopting image mask, feature extraction and matching to the original streetscape images to generate a multi-view geometrical relationship map;

S32, setting parameters, selecting an initial matching image pair on the basis of an incremental SFM algorithm, and constructing a relative orientation model, and then gradually adding the unconstructed streetscape image to construct a regional network model; adding new sequence images iteratively in the regional network model to generate a new sparse three-dimensional model; when the number of streetscape images in the sparse three-dimensional model is less than 3 (No), continuing to add new sequence images, until the number of streetscape images in the sparse three-dimensional model is greater than 3 (Yes); carrying out the next GPS/IMU data fusion to construct an absolute orientation model.

Figure 4:
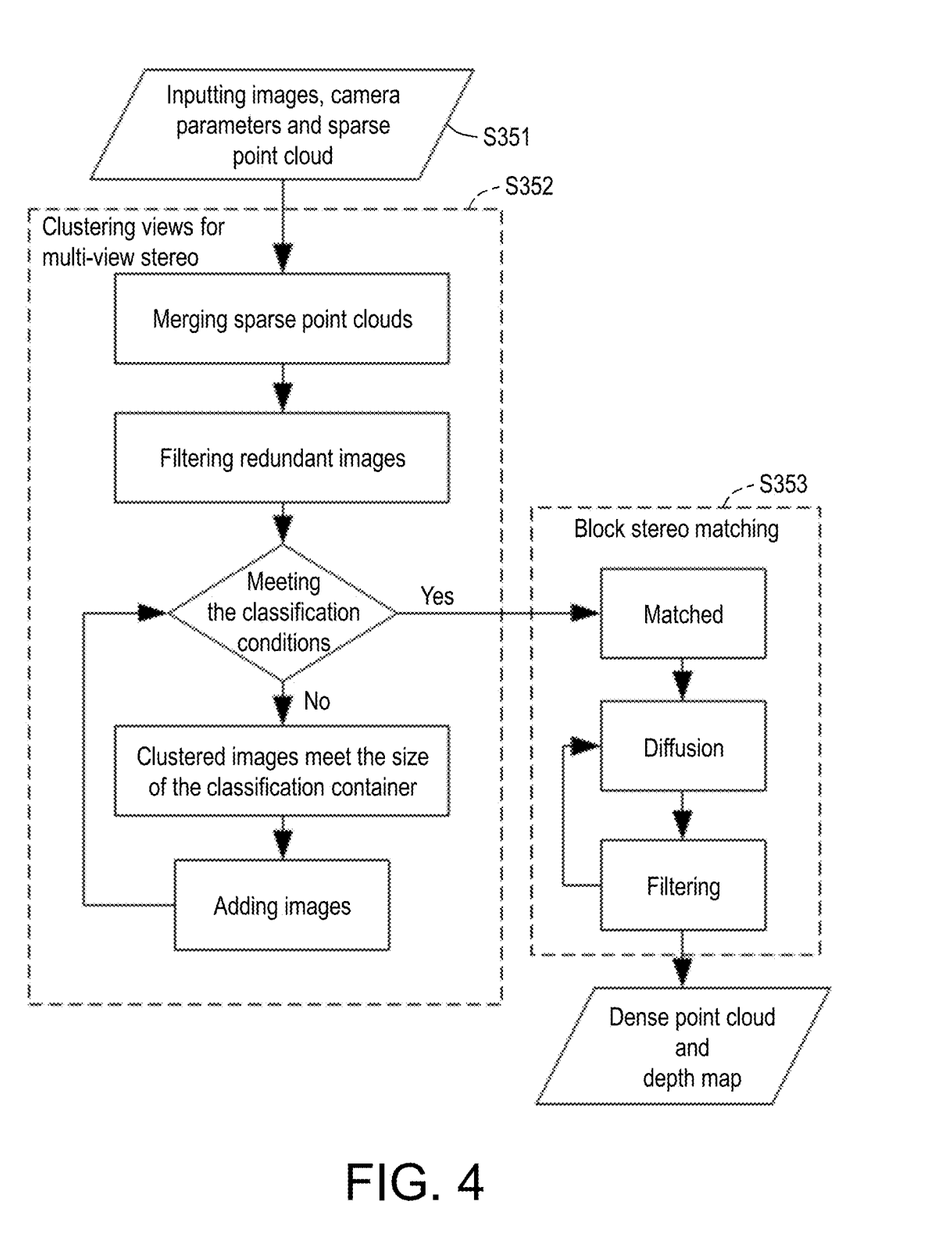
FIG. 4 is a flowchart of multi-view dense reconstruction algorithm (MVS) in a method for updating road signs and markings on the basis of monocular images according to the present invention.

S33, when the number of streetscape images in the sparse three-dimensional model is greater than 3 (Yes), fusing GPS/IMU prior constraint data to reduce the accumulation of model errors, incorporating the regional network model coordinates into the real geodetic coordinate system by an absolute orientation method, solving the error with the absolute orientation model by formula (2), if the error is greater than 10 cm (No), discarding the reconstructed regional network model, repeating steps S32-S33, and continuing to initialize and construct the next regional network model, until the error is less than 10 cm; the formula (2) in step S33 being:

$$\begin{cases} \begin{bmatrix} \sigma_{xi}^2 \\ \sigma_{yi}^2 \\ \sigma_{zi}^2 \end{bmatrix} = \lambda \begin{bmatrix} a_1 & a_2 & a_3 \\ b_1 & b_2 & b_3 \\ c_1 & c_2 & c_3 \end{bmatrix} \begin{bmatrix} X_i \\ Y_i \\ Z_i \end{bmatrix} + \begin{bmatrix} X_0 \\ Y_0 \\ Z_0 \end{bmatrix} - \begin{bmatrix} X_t^i \\ Y_t^i \\ Z_t^i \end{bmatrix} \\ \sigma = \frac{\sqrt{\sum_1^n (\sigma_{xi}^2 + \sigma_{yi}^2 + \sigma_{zi}^2)}}{n} \end{cases} \quad (2)$$

where, $[X_i, Y_i, Z_i]$ is the model coordinate of the i-th checkpoint; $\lambda$, $[\alpha_1, \alpha_2, \alpha_3; b_1, b_2, b_3; c_1, c_2, c_3]$ and $[X_0, Y_0, Z_0]$ are absolute orientation 7-parameter models; $[X_t^i, Y_t^i, Z_t^i]$ is the real geodetic coordinate of the i-th checkpoint; $[\sigma_{xi}, \sigma_{yi}, \sigma_{zi}]$ is the mean square error component corresponding to the i-th checkpoint, $\sigma$ is the mean square error of the point, and n is the number of checkpoints;

S34, when the error is less than 10 cm (Yes), adopting the local bundle adjustment to further optimize the attitude information of the monocular camera; after all the streetscape images are constructed, use the global bundle adjustment to further optimize and solve the internal and external parameter information of the sparse three-dimensional point cloud and the camera; and S35, reconstructing a streetscape image depth map by using the multi-view dense reconstruction method: as shown in FIG. 4, S351, inputting images, internal and external parameters of monocular camera and sparse point cloud;

S352, clustering views for multi-view stereo : merging sparse point clouds, filtering redundant images, and determining whether the classification conditions are met; if the classification conditions are met (No), carrying out block stereo matching; if the classification conditions are met (Yes), adding the streetscape images when the clustered images meet the size of the classification container, and re-determining whether the classification conditions are met; if the classification conditions are still not met, adding the streetscape images again until the classification conditions are met when the clustered images meet the size of the classification container; and S353, block stereo matching: first matching, recycling for multiple diffusion and filtration until dense point cloud and streetscape image depth map are generated.

In step S3, the present invention proposes to gradually fuse GPS/IMU data, and introduce the local bundle adjustment model, so as to solve the problem on model distortion or camera attitude error in SFM reconstruction, and realize the conversion from regional network model coordinates to real geodetic coordinates.

S4, solving an initial position of the road sign and marking: calculating the spatial positions of the road signs and markings according to the semantic and depth values of the image, the collinear equation and the spatial distance relationship;

In step S4 of calculating the spatial positions of the road signs and markings according to the collinear equation and the spatial distance relationship with the object space imaging in front of the monocular camera as the constraint condition, i.e., solving the spatial position of the sign of the road pole, the calculation formula is as follows (1):

$$\begin{cases} \begin{bmatrix} x_1 - x_0 \\ f \\ y_1 - y_0 \end{bmatrix} = \lambda * \begin{bmatrix} a_{11} & a_{12} & a_{13} \\ b_{11} & b_{12} & b_{13} \\ c_{11} & c_{12} & c_{13} \end{bmatrix} * \begin{bmatrix} a_{21} & a_{22} & a_{23} \\ b_{21} & b_{22} & b_{23} \\ c_{21} & c_{22} & c_{23} \end{bmatrix} \begin{bmatrix} X_A - X_{S1} \\ Y_A - Y_{S1} \\ Z_A - Z_{S1} \end{bmatrix} \\ d^2 = (X_A - X_{S1})^2 + (Y_A - Y_{S1})^2 + (Z_A - Z_{S1})^2 \\ \alpha = \cos^{-1} \frac{(X_A - X_{S1})*(X_{S2} - X_{S1}) + (Y_A - Y_{S1})*}{d * \sqrt{((X_{S2} - X_{S1})*(X_{S2} - X_{S1}) + (Y_{S2} - Y_{S1})*}} , \alpha < \pi < 2 \\ \phantom{\alpha = \cos^{-1}} \frac{(Y_{S2} - Y_{S1}) + (Z_A - Z_{S1})(Z_{S2} - Z_{S1})}{(Y_{S2} - Y_{S1}) + (Z_{S2} - Z_{S1})*(Z_{S2} - Z_{S1}))} \end{cases} \quad (1)$$

where, [x, f, y] is the coordinate of the skeleton point of the road pole or the sign and marking in the image plane coordinate system; [$x_0$, $y_0$] is the coordinate of the main point of the image; $\lambda$ is the projection coefficient; [$\alpha_{11}$, $\alpha_{12}$, $\alpha_{13}$; b11, b12, b13, c11, c12, c13 $b_{11}$, $b_{12}$, $b_{13}$; $c_{11}$, $c_{12}$, $c_{13}$] is the transition matrix from the auxiliary coordinate system of image space to the coordinate system of image plane; [$\alpha_{21}$, $\alpha_{22}$, $\alpha_{23}$; $b_{21}$, $b_{22}$, $b_{23}$; $c_{21}$, $c_{22}$, $c_{23}$] is the transition matrix from the geodetic coordinate system to the auxiliary coordinate system of the image space; [$X_A$, $Y_A$, $Z_A$] is the coordinate of the skeleton point of the road pole or the one of the road signs and markings in the geodetic coordinate system, and is a value to be calculated in this calculation method; [$X_{S1}$, $Y_{S1}$, $Z_{S1}$] and [$X_{S2}$, $Y_{S2}$, $Z_{S2}$] are coordinates of the photographing center of cameras in the front and rear camera stations, i.e. GPS value; d is the distance from a point of the object space to the photographing center of the camera; and $\alpha$ is the plane projection value of the included angle between the photographing center line $\overline{a}$ of connecting the front and rear monocular cameras and the photographing center line $\overline{b}$ of connecting a point of the object space and the front monocular camera; Step S4 further comprises: for the problem on longitudinal imaging of the road pole sign on the streetscape image, when the included angle of plane projection between the line $\overline{a}$ of connecting the photographing center of the monocular camera with the undetermined position of the road pole sign and the vehicle traveling direction $\overline{b}$ is $\alpha<90°$, this coordinate is selected as the spatial position of the road pole sign. When the sign of the road pole is imaged longitudinally on the image, the extracted skeleton point of the road pole is different with the height of the road pole, and there are two cases: higher than the installation position of the monocular camera and lower than the installation position of the monocular camera, resulting in the problem on multiple solutions to the spatial position information of the road sign solved in step S4. Therefore, by adding the constraint of the vehicle driving direction, that is, the included angle $\alpha$ of plane projection between the line $\overline{a}$ of connecting the camera photographing center with the undetermined position of the road pole sign and the vehicle traveling direction $\overline{b}$, if $\alpha<90°$, this coordinate is selected as the spatial position of the road pole sign.

S5, position fitting of road signs and marking under multi-view overlap: if the same road sign and marking is visible in multiple views, solving the position information of the road sign and marking by adopting a multi-view forward intersection method;

In step S5, when the same road signs and markings are visible in multiple views, the accurate position information is obtained by the least square fitting, as shown in formula (3), $$\begin{cases} \begin{bmatrix} x_1 - x_0 \\ f \\ y_1 - y_0 \end{bmatrix} = \lambda * \begin{bmatrix} a_{11} & a_{12} & a_{13} \\ b_{11} & b_{12} & b_{13} \\ c_{11} & c_{12} & c_{13} \end{bmatrix} * \begin{bmatrix} a_1 & a_2 & a_3 \\ b_1 & b_2 & b_3 \\ c_1 & c_2 & c_3 \end{bmatrix} \begin{bmatrix} X_A - X_{S1} \\ Y_A - Y_{S1} \\ Z_A - Z_{S1} \end{bmatrix} \\ \vdots \\ \begin{bmatrix} x_n - x_0 \\ f \\ y_n - y_0 \end{bmatrix} = \lambda * \begin{bmatrix} a_{n1} & a_{n2} & a_{n3} \\ b_{n1} & b_{n2} & b_{n3} \\ c_{n1} & c_{n2} & c_{n3} \end{bmatrix} * \begin{bmatrix} a_1 & a_2 & a_3 \\ b_1 & b_2 & b_3 \\ c_1 & c_2 & c_3 \end{bmatrix} \begin{bmatrix} X_A - X_{Sn} \\ Y_A - Y_{Sn} \\ Z_A - Z_{Sn} \end{bmatrix} \\ d_i^2 = (X_A - X_{Si})^2 + (Y_A - Y_{Si})^2 + (Z_A - Z_{Si})^2, 1 \le i \le n \end{cases} \quad (3)$$

where, [$x_1$, $y_1$, $x_n$, $y_n$] is the image coordinate projected on multiple views for the same road sign or marking of the object space; [$x_0$, $y_0$] is the coordinate of the main point of the image; f is the focal distance of the camera; $\lambda$ is the projection coefficient; [$X_A$, $Y_A$, $Z_A$] is the object space coordinate to be calculated for the road sign and marking; [$X_{Si}$, $Y_{Si}$, $Z_{Si}$] is the corresponding camera position for the i-th image, $1 \le i \le n$, when i is n, [$X_{Sn}$, $Y_{Sn}$, $Z_{Sn}$]; [$\alpha_{11}$, $\alpha_{12}$, $\alpha_{13}$; $b_{11}$, $b_{12}$, $b_{13}$; $c_{11}$, $c_{12}$, $c_{13}$] and [$\alpha_{n1}$, $\alpha_{n2}$, $\alpha_{n3}$; $b_{n1}$, $b_{n2}$, $b_{n3}$; $c_{n1}$, $c_{n2}$, $c_{n3}$] are expressed as the transition matrix from the auxiliary coordinate system of the image space to the coordinate system of the image plane of the corresponding image; [$\alpha_1$, $\alpha_2$, $\alpha_3$; $b_1$, $b_2$, $b_3$; $c_1$, $c_2$, $c_3$] is the transition matrix from the geodetic coordinate system to the auxiliary coordinate system of the image space; and $d_i$ is the spatial distance between the road sign and marking to be calculate and the photographing center of the i-th streetscape image; and S6, data fusion and updating: in GIS software, vectorizing the position information of the road signs and markings obtained in steps S4 and S5, and fusing into the original data to update the data of the road signs and markings.

Figure 5:
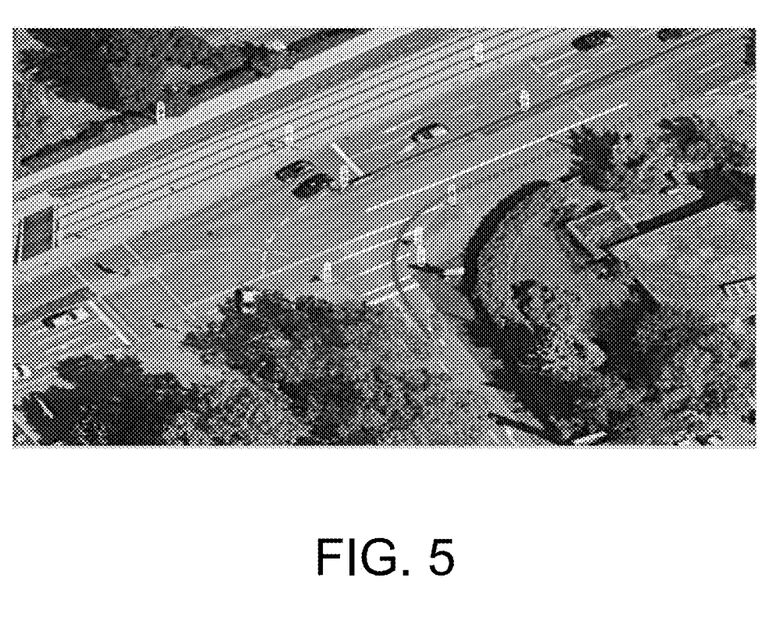
FIG. 5 shows the effect of a method for updating road signs and markings on the basis of monocular images according to the present invention.

FIG. 5 is a software interface diagram of the automatic acquisition of road signs and markings by this method in this embodiment, where the elements rendered with white traffic light symbols represent the road rod-shaped signs; since example segmentation is not performed in the image semantic segmentation, it is necessary to further input its type attribute against the streetscape image; the white line indicates the road marking and stop line; there is no further distinction on the marking category here, and it needs to be further finished according to the actual situation; the execution process of the whole software function is roughly as follows: with the video playing, the spatial positions of the road signs and markings are solved in real time and rendered on the map; and when a user finds that there is no element change in the current road section, he/she can drag the video progress bar to update the changed road section.

The foregoing are only better embodiments of the present invention and are not intended to limit the present invention. Any modification, equivalent replacement, improvement, etc. made within the spirit and principles of the present invention shall be covered within the scope of protection for the present invention.

What is claimed is:

1. A method for updating road signs and markings on the basis of monocular images, executed by a processor, comprising the following steps:
   (S1) acquiring streetscape images of urban roads and coordinates of Global Positioning System (GPS) and spatial attitude data corresponding to the streetscape images through mobile data acquisition equipment;
   (S2) sequentially preprocessing and processing a correction on the streetscape images obtained in step (S1), semantically segmenting elements on the corrected images using the deep learning semantic segmentation technology by category, converting the segmented streetscape images of the road signs and markings into binary image maps, and extracting image coordinates of skeleton points of road signs and image positions of road markings in the binary image maps;
   (S3) constructing a sparse three-dimensional model, calculating the attitude of the mobile data acquisition equipment and the spatial position of the sparse three-dimensional point cloud, and then generating a streetscape image depth map on the basis of a multi-view dense reconstruction technology according to the reconstructed sparse three-dimensional point cloud and the internal and external parameters of the mobile data acquisition equipment;
   (S4) calculating spatial positions of the road signs and markings according to semantic and depth values of the image, a collinear equation and a spatial distance relationship;
   (S5) solving position information of the road signs and markings by adopting a multi-view forward intersection method in response to same road sign and marking is visible in multiple views, wherein the position information is obtained by the least square fitting, as shown in the following formula, $$\begin{cases} \begin{bmatrix} x_1 - x_0 \\ f \\ y_1 - y_0 \end{bmatrix} = \lambda * \begin{bmatrix} a_{11} & a_{12} & a_{13} \\ b_{11} & b_{12} & b_{13} \\ c_{11} & c_{12} & c_{13} \end{bmatrix} * \begin{bmatrix} a_1 & a_2 & a_3 \\ b_1 & b_2 & b_3 \\ c_1 & c_2 & c_3 \end{bmatrix} \begin{bmatrix} X_A - X_{S1} \\ Y_A - Y_{S1} \\ Z_A - Z_{S1} \end{bmatrix} \\ \vdots \\ \begin{bmatrix} x_n - x_0 \\ f \\ y_n - y_0 \end{bmatrix} = \lambda * \begin{bmatrix} a_{n1} & a_{n2} & a_{n3} \\ b_{n1} & b_{n2} & b_{n3} \\ c_{n1} & c_{n2} & c_{n3} \end{bmatrix} * \begin{bmatrix} a_1 & a_2 & a_3 \\ b_1 & b_2 & b_3 \\ c_1 & c_2 & c_3 \end{bmatrix} \begin{bmatrix} X_A - X_{Sn} \\ Y_A - Y_{Sn} \\ Z_A - Z_{Sn} \end{bmatrix} \\ d_i^2 = (X_A - X_{Si})^2 + (Y_A - Y_{Si})^2 + (Z_A - Z_{Si})^2, 1 \le i \le n \end{cases}$$

where, $[x_1, y_1, x_n, y_n]$ is the image coordinate projected on multiple views for the same road signs or markings of object space; $[x_0, y_0]$ is coordinate of main point of the image; f is the focal distance of the camera; $\lambda$ is projection coefficient; $[X_A, Y_A, Z_A]$ is coordinate of the object space to be calculated for the road signs and markings; $[X_{Si}, Y_{Si}, Z_{Si}]$ is the corresponding camera position for the i-th image, $1 \le i \le n$, when i is n, $[X_{Sn}, Y_{Sn}, Z_{Sn}]$; $[\alpha_{11}, \alpha_{12}, \alpha_{13}; b_{11}, b_{12}, b_{13}; c_{11}, c_{12}, c_{13}]$ and $[\alpha_{n1}, \alpha_{n2}, \alpha_{n3}; b_{n1}, b_{n2}, b_{n3}; c_{n1}, c_{n2}, c_{n3}]$ are expressed as transition matrix from auxiliary coordinate system of image space to the coordinate system of image plane of corresponding image; $[\alpha_1, \alpha_2, \alpha_3; b_1, b_2, b_3; c_1, c_2, c_3]$ is the transition matrix from geodetic coordinate system to the auxiliary coordinate system of the image space; and $d_i$ is the spatial distance between the road signs and markings to be calculate and the photographing center of the i-th streetscape image; and
   (S6) vectorizing the solved position information of the road signs and markings, and fusing into the original data to update the data of the road signs and markings.

2. The method for updating road signs and markings on the basis of monocular images according to claim 1, wherein the mobile data acquisition equipment in step (S1) integrates a monocular camera and a GPS/IMU equipment, installing the mobile data acquisition equipment in a forward-looking window of a vehicle, and acquiring a relative pose relationship between the monocular camera and the GPS/IMU equipment and the internal reference information of the monocular camera.

3. The method for updating road signs and markings on the basis of monocular images according to claim 2, wherein step (S2) comprises the following steps:
   preprocessing the streetscape images using image processing technologies;
   carrying out the correction on the preprocessed streetscape images in combination with the internal reference of the monocular camera;
   making the streetscape images after processing the correction into DeeplabV3+network training dataset on the basis of a data label tool, and adopting the GeoAI deep learning framework to realize training, validation and testing of the model, and segmenting label elements on the streetscape images by category, the label elements comprising sky, trees, road signs, road markings and lane surfaces;
   eliminating the sky and trees in the streetscape images after processing the correction by using image mask technology on the basis of semantic segmented label data;
   carrying out semantic segmentation on elements of road signs and markings in the streetscape images, converting the streetscape images into binary images, and extracting image coordinate information of the road signs and markings from the binary images through vision algorithms;
   extracting a connected region of a binary image for road sign elements, and calculating a shape descriptor of the connected region to extract the image coordinates of the skeleton points of the road signs; and
   extracting image positions of road markings for road marking elements by using Hough transform algorithm.

4. The method for updating road signs and markings on the basis of monocular images according to claim 3, wherein in step (S4) of calculating the spatial positions of the road signs and markings according to the collinear equation and the spatial distance relationship with imaging the object space in front of the monocular camera as a constraint condition by the following formula:

$$\begin{cases} \begin{bmatrix} x-x_0 \\ f \\ y-y_0 \end{bmatrix} = \lambda * \begin{bmatrix} a_{11} & a_{12} & a_{13} \\ b_{11} & b_{12} & b_{13} \\ c_{11} & c_{12} & c_{13} \end{bmatrix} * \begin{bmatrix} a_{21} & a_{22} & a_{23} \\ b_{21} & b_{22} & b_{23} \\ c_{21} & c_{22} & c_{23} \end{bmatrix} \begin{bmatrix} X_A - X_{S1} \\ Y_A - Y_{S1} \\ Z_A - Z_{S1} \end{bmatrix} \\ d^2 = (X_A - X_{S1})^2 + (Y_A - Y_{S1})^2 + (Z_A - Z_{S1})^2 \\ \alpha = \cos^{-1} \frac{(X_A - X_{S1})*(X_{S2} - X_{S1}) + (Y_A - Y_{S1})*(Y_{S2} - Y_{S1}) + (Z_A - Z_{S1})(Z_{S2} - Z_{S1})}{d * \sqrt{((X_{S2} - X_{S1})*(X_{S2} - X_{S1}) + (Y_{S2} - Y_{S1})*(Y_{S2} - Y_{S1}) + (Z_{S2} - Z_{S1})*(Z_{S2} - Z_{S1}))}}, \alpha < \pi < 2 \end{cases}$$

where, [x, f, y] is a coordinate of the skeleton point of a road pole or one of the road signs and markings in the image plane coordinate system; $[x_0, y_0]$ is the coordinate of the main point of the image; $\lambda$ is the projection coefficient; $[\alpha_{11}, \alpha_{12}, \alpha_{13}; b_{11}, b_{12}, b_{13}; c_{11}, c_{12}, c_{13}]$ is the transition matrix from the auxiliary coordinate system of image space to the coordinate system of the image plane; $[\alpha_{21}, \alpha_{22}, \alpha_{23}; b_{21}, b_{22}, b_{23}; c_{21}, c_{22}, c_{23}]$ is the transition matrix from the geodetic coordinate system to the auxiliary coordinate system of the image space; $[X_A, Y_A, Z_A]$ is the coordinate of the skeleton point of the road pole or the one of the road signs and markings in the geodetic coordinate system; $[X_{S1}, Y_{S1}, Z_{S1}]$ and $[X_{S2}, Y_{S2}, Z_{S2}]$ are coordinates of the photographing center of cameras in the front and rear camera stations; d is the distance from a point of the object space to the photographing center of the camera; and $\alpha$ is plane projection value of an angle between a photographing center line $\overline{\alpha}$ of connecting the front and rear monocular cameras and a photographing center line $\overline{b}$ of connecting the point of the object space and the front monocular camera.

5. The method for updating road signs and markings on the basis of monocular images according to claim 3, wherein step (S3) comprises the following steps:

(S31) extracting feature points of the streetscape images through SIFT algorithm, and adopting image mask, feature extraction and matching to the original streetscape images to generate a multi-view geometrical relationship map;

(S32) selecting an initial matching image pair on the basis of an incremental SFM algorithm, and constructing a regional network model; adding new sequence images iteratively in the construction of the regional network model to generate a new sparse three-dimensional model; when number of the streetscape images in the sparse three-dimensional model is less than 3, continuing to add new sequence images, until the number of the streetscape images in the sparse three-dimensional model is greater than 3;

(S33) when the number of the streetscape images in the sparse three-dimensional model is greater than 3, fusing GPS/IMU prior constraint data to reduce the accumulation of model error, incorporating regional network model coordinates into the real geodetic coordinate system by an absolute orientation method, solving the model error with an absolute orientation model by the following formula;

$$\begin{cases} \begin{bmatrix} \sigma_{xi}^2 \\ \sigma_{yi}^2 \\ \sigma_{zi}^2 \end{bmatrix} = \lambda \begin{bmatrix} a_1 & a_2 & a_3 \\ b_1 & b_2 & b_3 \\ c_1 & c_2 & c_3 \end{bmatrix} \begin{bmatrix} X_i \\ Y_i \\ Z_i \end{bmatrix} + \begin{bmatrix} X_0 \\ Y_0 \\ Z_0 \end{bmatrix} - \begin{bmatrix} X_t^i \\ Y_t^i \\ Z_t^i \end{bmatrix} \\ \sigma = \frac{\sqrt{\sum_{1}^{n}(\sigma_{xi}^2 + \sigma_{yi}^2 + \sigma_{zi}^2)}}{n} \end{cases};$$

where, $[X_i, Y_i, Z_i]$ is a model coordinate of i-th checkpoint, $\lambda$, $[\alpha_1, \alpha_2, \alpha_3; b_1, b_2, b_3; c_1, c_2, c_3]$ and $[X_0, Y_0, Z_0]$ are absolute orientation 7-parameter models; $[X_t^i, Y_t^i, Z_t^i]$ is real geodetic coordinate of the i-th checkpoint; $[\sigma_{xi}, \sigma_{yi}, \sigma_{zi}]$ is component of mean square error corresponding to the i-th checkpoint, $\sigma$ is the mean square error of the point of the object space, and n is the number of checkpoints;

wherein if the model error is greater than 10 cm, discarding the reconstructed regional network model, repeating steps (S32)-(S33), and continuing to initialize and construct the next regional network model, until the model error is less than 10 cm;

(S34) when the model error is less than 10 cm, optimizing the attitude information of the monocular camera; after all of the streetscape images are constructed, use the global bundle adjustment to solve the internal and external parameter information of the sparse three-dimensional point cloud and the monocular camera; and (S35) reconstructing a depth map of the streetscape images by using a multi-view dense reconstruction method.

6. The method for updating road signs and markings on the basis of monocular images according to claim 5, wherein in step (S4), further comprising: when the angle $\alpha$ between a photographing center line $\alpha$ of connecting the monocular camera with a undetermined position of a road pole sign and a vehicle traveling direction is less than 90°, selecting a coordinate of the road pole sign as a spatial position of the road pole sign.

7. The method for updating road signs and markings on the basis of monocular images according to claim 5, wherein in step of carrying out element segmentation on the streetscape images after processing the correction comprises the following steps:

(S231) data preparation: with reference to format specifications of open source datasets, structuring data of the streetscape images, and importing data labels;

(S232) carrying out model training, validation and testing through GeoAI depth learning framework in combination with DeeplabV3+ neural network model;

(S2321) setting parameters, and importing the training model;

(S2322) carrying out model training;

(S2323) carrying out model validation if the obtained model is global predetermined optimal value; in case of not returning to step (S2322), carrying out model training again, until the obtained model is the global predetermined optimal value;

(S2324) if the model validation result meets predetermined accuracy, outputting the model; in case of not meeting the predetermined accuracy, returning to step (S2321), repeating steps (S2321)-(S2324) until the model validation results meet the predetermined accuracy, and outputting the model;

(S2325) visualizing the test results of the output model; and
(S233) model deployment and application: saving the model locally and deploying the model to the server.

* * * * *